(12) United States Patent
Jeitner

(10) Patent No.: US 7,723,658 B2
(45) Date of Patent: *May 25, 2010

(54) SOLAR SENSOR HAVING MICROSPHERES ON THE INSIDE FACE OF THE PROTECTIVE CAP

(75) Inventor: Martin Jeitner, Ostheim (DE)

(73) Assignee: PREH GmbH (DE)

( * ) Notice: Subject to any disclaimer, the term of this patent is extended or adjusted under 35 U.S.C. 154(b) by 203 days.

This patent is subject to a terminal disclaimer.

(21) Appl. No.: 11/283,771

(22) Filed: Nov. 22, 2005

(65) Prior Publication Data

US 2006/0131476 A1   Jun. 22, 2006

Related U.S. Application Data

(63) Continuation of application No. PCT/EP2004/005448, filed on May 19, 2004.

(30) Foreign Application Priority Data

May 22, 2003  (DE) ................ 103 23 709
Jul. 6, 2005   (DE) ................ 10 2005 031 546

(51) Int. Cl.
*G01J 1/20* (2006.01)

(52) U.S. Cl. ................ 250/203.4; 250/216

(58) Field of Classification Search ............ 250/203.4, 250/216
See application file for complete search history.

(56) References Cited

U.S. PATENT DOCUMENTS

| | | | | | |
|---|---|---|---|---|---|
| 4,548,196 | A | * | 10/1985 | Torobin | 126/654 |
| 4,933,550 | A | * | 6/1990 | Hegyi | 250/237 R |
| 4,943,141 | A | * | 7/1990 | Mori | 359/619 |
| 5,181,654 | A | * | 1/1993 | Yoshimi et al. | 250/203.4 |
| 5,274,405 | A | * | 12/1993 | Webster | 351/158 |
| 5,471,053 | A | * | 11/1995 | Diner et al. | 250/228 |
| 2001/0015846 | A1 * | | 8/2001 | Morris et al. | 359/453 |
| 2001/0043996 | A1 * | | 11/2001 | Yamada et al. | 428/34.4 |
| 2002/0034618 | A1 * | | 3/2002 | Moshrefzadeh et al. | 428/206 |

FOREIGN PATENT DOCUMENTS

DE    100 62 932 A1    6/2002
EP    0 492 352 A2     7/1992

* cited by examiner

*Primary Examiner*—Georgia Y Epps
*Assistant Examiner*—Kevin Wyatt
(74) *Attorney, Agent, or Firm*—Cantor Colburn LLP

(57) ABSTRACT

A solar sensor is provided that has microspheres on an interior face of a protective cap or of another radiation-transparent area above a transducer of the sensor. The microspheres scatter the light but at the same time have a much lower damping effect. Preferably, the microspheres are glued to or sealed into the interior face.

11 Claims, 1 Drawing Sheet

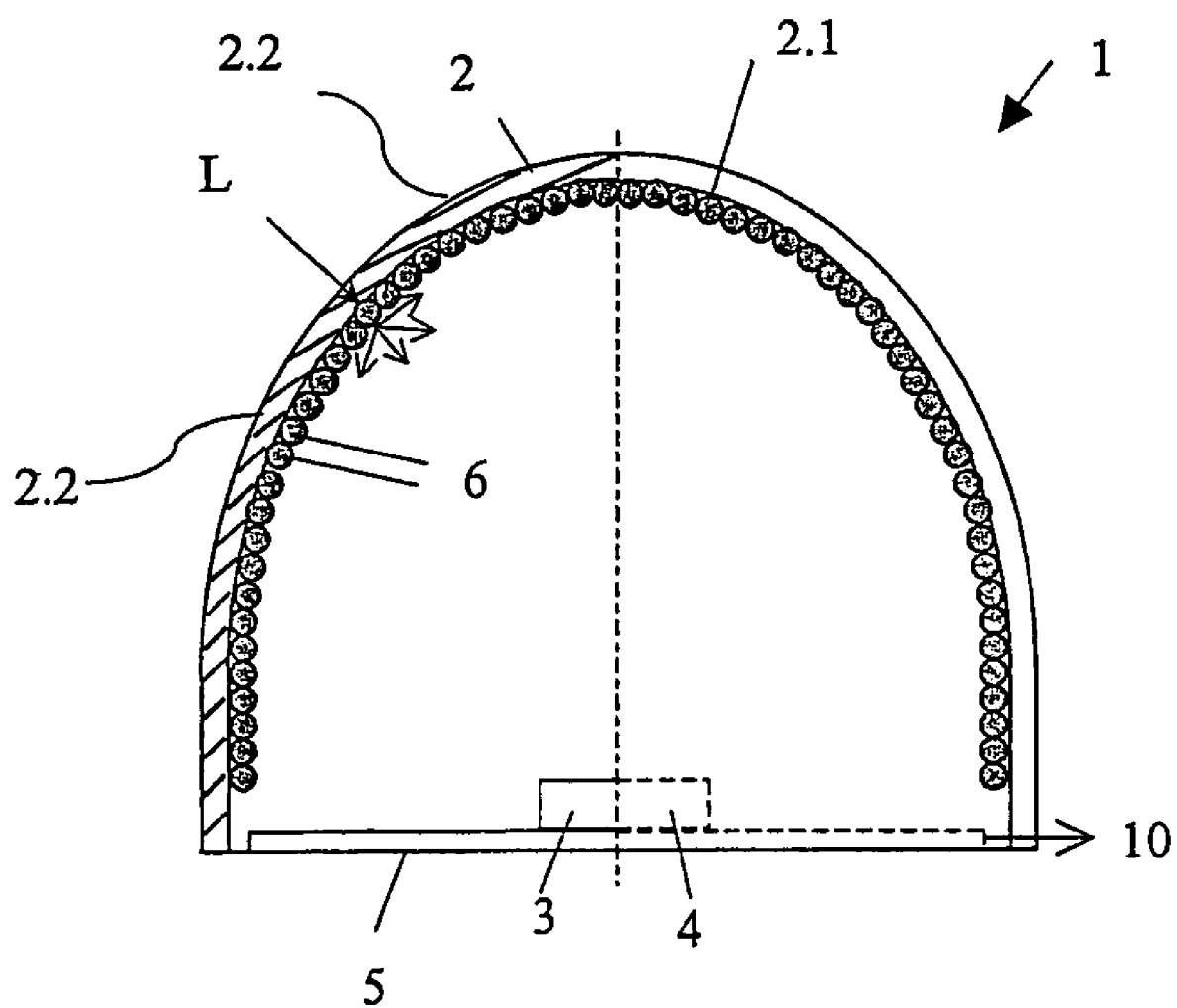

SOLAR SENSOR HAVING MICROSPHERES ON THE INSIDE FACE OF THE PROTECTIVE CAP

This nonprovisional application is a continuation application of PCT/EP2004/005448, which was filed on May 19, 2004, and which claims priority to German Patent Application No. DE 10323709.7, which was filed in Germany on May 22, 2003, and which are both herein incorporated by reference. This nonprovisional application also claims priority under 35 U.S.C. §119(a) on German Patent Application No. DE 102005031546, which was filed in Germany on Jul. 6, 2005, and which is also herein incorporated by reference.

BACKGROUND OF THE INVENTION

1. Field of the Invention

The present invention relates to a solar sensor having a transducer and a radiation-transparent area, for example, in a cap, or in a housing, above the transducer.

2. Description of the Background Art

From EP 0 492 352 B1, a sun sensor is known, which as an electro-optical transducer has a light-sensitive surface. The lens of the sensor located above the transducer is thereby a part of the housing, which, like the lens, is made of a light-permeating material, for example, plastic, or glass. The material of the lens is itself dispersive.

DE 100 62 932 A1 also describes a sun sensor. The electroscopic converter is thereby mounted below a concentrating area for the incident sunlight that is integrated in a cover. The concentrating area and the electroscopic converter are arranged such that incident sunlight striking a first angle of incidence area is scattered through the concentration area before it strikes the converter. In this way, the sunlight is scattered in a predetermined angle range, whereas it is not scattered outside this area. By dispersing the sunlight in the first angle range, a reduction of the sunlight striking the transducer is accomplished, thereby avoiding or reducing an inflated signal in the angle range. The concentrating area has an increased surface asperity, compared to the remaining surface of the sensor cover.

SUMMARY OF THE INVENTION

It is therefore an object of the present invention to provide a solar sensor that even with a flat incidence angle of sunlight generates a signal that is relative to the intensity of the solar radiation.

An embodiment of the invention provides that an inside of a protective cap, that is, a radiation-transparent area covering the transducer of the sensor, is provided with microspheres, which also scatter the light, but at the same time have a much lower damping effect. Preferably, the microspheres are glued or sealed into the topside. Possible materials for the spheres are plastic or glass. Crucial is the transparency as well as a roughly sphere-like shape.

These microspheres have a higher dispersive effect because, due to their shape, they have a greater incline of steeper edges as compared to conventional microstructures. This results in stronger additional refractions, whereby the additional refraction occurs upon entry into the spheres. The microspheres as such have low absorption, that is, a low absorption behavior so that with smaller receiving surfaces, a comparable signal can be generated. Furthermore, the dispersion is homogenous due to the continuous spherical properties.

One advantage of this solution is that despite a strong and intended scattering effect, a high light intensity is maintained.

A further advantage is gained in the fabrication of the sensors. The microspheres can be attached to the entire inner face of the plastic cap of the sensor. The commonly experienced adhesion to tools can thus be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the figure shows a partial cross-sectional illustration of a protective cap for a solar sensor according to an embodiment of the present invention.

DETAILED DESCRIPTION

The solar sensor 1 includes a housing, or a cap 2, which covers a transducer 3 as well as additional electrical components 4 located in the sensor 1, and a circuit board 5 for housing and electrically connecting the components 3, 4, to further, not illustrated, electrical modules inside the sensor 1, or additional modules 10 located outside the sensor 1. In the instant embodiment, the entire cap 2 illustrates a radiation-transparent area 2.2. A smaller area is also possible. Located below this sensor cap 2, preferably on its inner side 2.1, is a layer of microspheres 6, through which light L, after passing through the radiation-permeable area 2.2 of the cap 2, is once again, and thus additionally, scattered and directed onto the transducer 3.

Preferably, the cap 2 is made of, for example, a synthetic material, such as polycarbonate, or of glass. The microspheres 6 are of a similar or identical material, and like the cap 2, are transparent. It is preferred for the shape of the microspheres 6 to be spherical, or at least sphere-like.

The microspheres can have a diameter of between 10 µm to 500 µm, preferably between 60 µm to 100 µm, or 40 µm to 70 µm, for example. Other sizes are equally effective, however, they could potentially cause problems when applied or processed. The diametrical range stated above is produced through filtering and can be obtained from various manufacturers, for example, Potters, SiLi, or Siltrade.

In addition, the microspheres 6 can be hollow. A hollow microsphere 6 has the advantage that light is dispersed, e.g., diffused, even greater with a hollow microsphere 6 than with a solid microsphere 6. Also, a hollow microsphere 6 absorbs less light than a solid microsphere 6. Furthermore, the microsphere 6 and/or the cap 2 can be colored for, for example, aesthetic purposes, to filter certain spectrums of the light, etc. A film, such as a tinted film, can also be applied to, for example, an outer surface of the cap 2.

The microshperes 6 can be applied by first applying an adhesive to the inner side 2.1 of the cap 2, then applying the microspheres 6. Thereafter, the microspheres 6 that did not adhere to the cap 2 are removed. The microshperes 6 can be applied to the cap 2 via suction into a heated air flow. The microspheres 6 can be preheated and filled into the cap 2, whereby, the heated microshperes 6 melt the inner side 2.1 of the cap 2 and adhere to the cap 2 by this melt process. Also, the microspheres 6 can be provided in a liquid synthetic material, for example a two component synthetic material, and can be sprayed onto the inner side 2.1 of the cap 2. Although only one layer of microspheres 6 is shown in the figure, it is noted that there can be several layers of microspheres 6, in particular several layers of hollow microspheres 6 on the cap 2.

The transducer 3 can be an electro-optical, an infrared, or any other conventional transducer that supplies a radiation-equivalent electrical signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A solar sensor comprising:
   a transducer;
   a housing having a radiation-transparent area that is located above the transducer; and
   microspheres being provided in the radiation-transparent area for scattering light that is emitted through the radiation-transparent area.

2. The solar sensor according to claim 1, wherein the microspheres are fixedly adhered to an inner surface of the housing.

3. The solar sensor according to claim 1, wherein the microspheres are fused into an inner side of the radiation-transparent area.

4. The solar sensor according to claim 1, wherein the microspheres are applied or fused in as a layer.

5. The solar sensor according to claim 1, wherein the microspheres are spherical.

6. The solar sensor according to claim 1, wherein the microspheres are made of plastic or glass.

7. The solar sensor according to claim 1, wherein the microspheres have a diameter of between 40 µm and 70 µm.

8. A solar sensor comprising:
   a transducer for providing a radiation based electrical signal;
   a housing for substantially encompassing the transducer, the housing having a radiation transparent area for allowing incident radiation to pass through the radiation transparent area towards the transducer; and
   a plurality of microspheres being provided on an inner surface of at least the radiation transparent area of the housing, the plurality of microspheres dispersing the incident radiation within the housing.

9. The solar sensor according to claim 8, wherein the microspheres are hollow.

10. A method of manufacturing a solar sensor, the method comprising the steps of:
    providing a housing having a radiation transparent area; and
    spraying at least one layer of a plurality of microspheres onto an inner side of the housing within at least the radiation transparent area; the microspheres diffusing light, which is radiated towards the housing, within the housing and towards a transducer that generates an electrical signal on the basis of a light intensity of the diffused light.

11. The solar sensor according to claim 1, wherein the transducer is an electro-optical transducer that supplies a radiation-equivalent electrical signal.

* * * * *